(12) United States Patent
Hammons et al.

(10) Patent No.: US 11,930,243 B2
(45) Date of Patent: Mar. 12, 2024

(54) PERIPHERAL DEVICE REGISTRATION IN AND MIGRATION BETWEEN ENVIRONMENTS

(71) Applicant: Dell Products L.P., Round Rock, TX (US)

(72) Inventors: Marc Randall Hammons, Round Rock, TX (US); Jake Mitchell Leland, Round Rock, TX (US); Tyler Ryan Cox, Austin, TX (US); Ryan Nicholas Comer, Round Rock, TX (US); Uboho Thomas Victor, San Antonio, TX (US); Erik Summa, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 193 days.

(21) Appl. No.: 17/646,970

(22) Filed: Jan. 4, 2022

(65) Prior Publication Data

US 2023/0217064 A1 Jul. 6, 2023

(51) Int. Cl.
| | |
|---|---|
| *H04N 21/4363* | (2011.01) |
| *H04L 65/1069* | (2022.01) |
| *H04L 65/611* | (2022.01) |
| *H04L 65/65* | (2022.01) |

(52) U.S. Cl.
CPC ... *H04N 21/43637* (2013.01); *H04L 65/1069* (2013.01); *H04L 65/611* (2022.05); *H04L 65/65* (2022.05)

(58) Field of Classification Search
CPC . H04N 21/43637; H04L 65/611; H04L 65/65; H04L 65/1069
See application file for complete search history.

(56) References Cited

U.S. PATENT DOCUMENTS

| | | | |
|---|---|---|---|
| 2017/0013401 A1* | 1/2017 | Jonsson | H04W 4/023 |
| 2018/0359322 A1* | 12/2018 | Dong | H04L 12/4633 |
| 2019/0215327 A1* | 7/2019 | Murthy | H04L 63/107 |

* cited by examiner

*Primary Examiner* — Chenea Davis
(74) *Attorney, Agent, or Firm* — Norton Rose Fulbright US LLP

(57) ABSTRACT

Systems and methods described herein may provide a system that enables game play or other application sessions from a set of candidate game hosts and environments to consumption devices of a user's choice while the user moves about their home between the different environments. The system may employ methods to determine where a user is located within the home, availability and selection of candidate game hosting and target environments, homing and direction of related I/O and audio-visual (AV) content for consumption. The solution accommodates multiple users simultaneously within the home, whether in single player, multiplayer using the same screen, or multiplayer using separate screen games. The solution may configure AV and input/output (I/O) such that multiple users can consume one or multiple games in the home simultaneously, whether in separate locations or when seated together in front of the same consumption device.

20 Claims, 14 Drawing Sheets

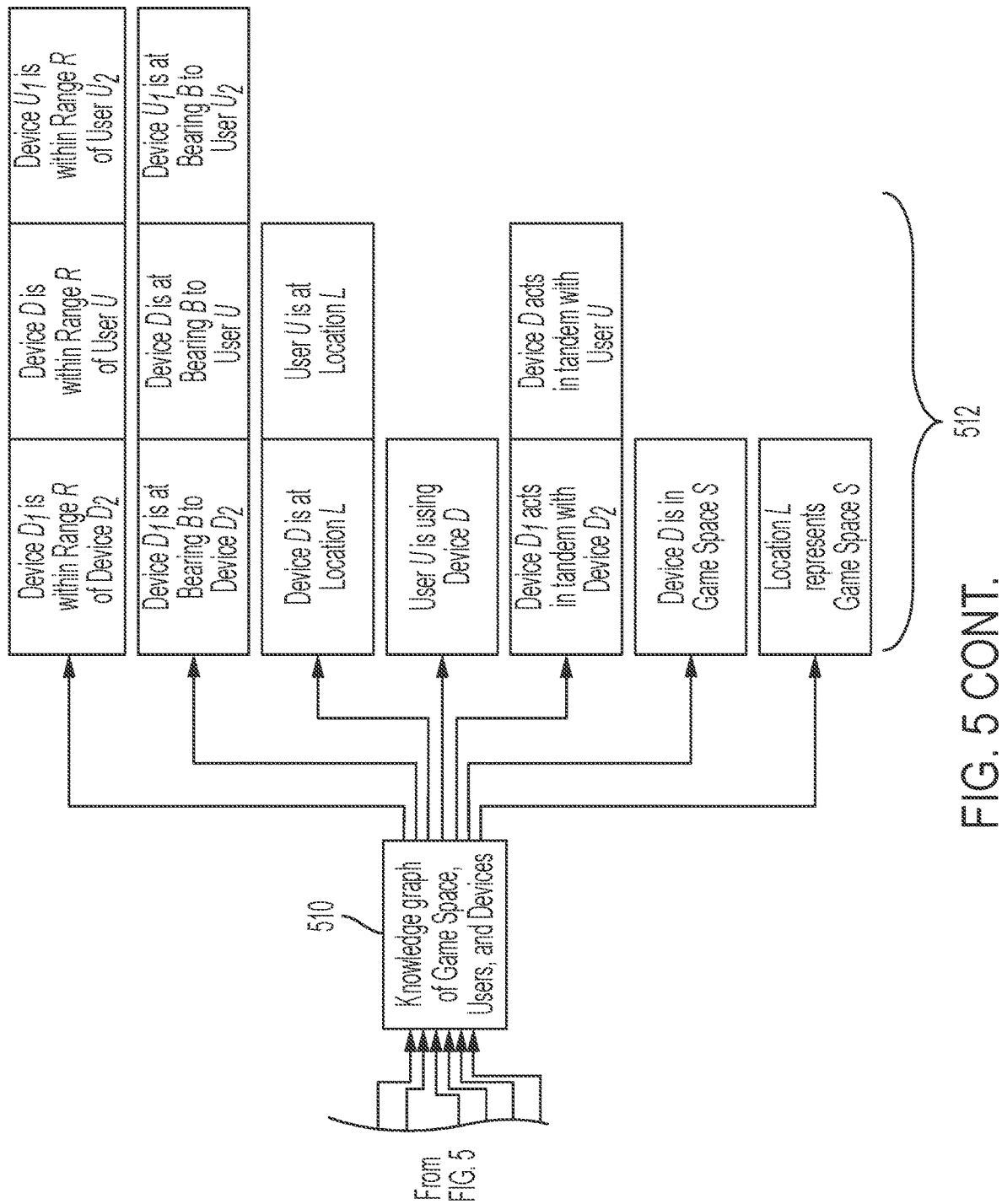

| Device | Metadata | Mobility | IP Address | WiFi | Bluetooth |
|---|---|---|---|---|---|
| LAPTOP | Windows PC | Mobile | Yes | Access Point Signature 1 (MYHOME, CASABLANCA, LAKEHOUSE) | Discoverable |
| HUB | Windows PC | Fixed | Yes | Access Point Signature 2 (MYHOME, ATT2145, CASABLANCA) | Discoverable |

FIG. 6

| Device | Metadata | Mobility | GPS | WiFi | Presence | Interactions |
|---|---|---|---|---|---|---|
| PHONE | Android Phone | Mobile | Coordinates | Access Point Signature 1 | N/A | User 1 Input |
| HUB | Windows PC | Fixed | N/A | Access Point Signature 2 | User 1 Present | None |

FIG. 7

| Device | Metadata | Mobility | GPS | Biometrics | Motion | WiFi |
|---|---|---|---|---|---|---|
| PHONE | Android Phone | Mobile | Coordinates | User 1 Fingerprint | Accelerometer Activity | Connected to Network |
| LAPTOP | Windows PC | Mobile | N/A | No Users Authenticated | Accelerometer Activity | Connected to Network |

FIG. 8

| Device | Metadata | Mobility | GPS | WiFi | Motion | Biometrics |
|---|---|---|---|---|---|---|
| CONTROLLER | Adapt Controller | Mobile | Coordinates | Access Point Signature 1 | Accelerometer Activity | User 1 Voice |
| TV | TV | Fixed | N/A | Access Point Signature 2 | N/A | N/A |

FIG. 9

PERIPHERAL DEVICE REGISTRATION IN AND MIGRATION BETWEEN ENVIRONMENTS

FIELD OF THE DISCLOSURE

The instant disclosure relates to information handling systems. More specifically, portions of this disclosure relate to executing applications for a user roaming between devices.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Users of information handling systems are mobile within environments that may include multiple information handling systems. Despite the rise in device mobility and exponential growth of information handling systems, user information remains static and immobile. Conventional cloud computing systems may provide access to data from a mobile device at many locations, but the user must manually configure their mobile device to access the data. When the user changes devices, the user must again manually setup the new device to access information or services in the cloud. Further, when the user changes environments, the user must manually reconfigure their device for the new environment.

SUMMARY

Aspects of embodiments of this disclosure allow a user to move between environments, move between devices, and/or move between services through automated configuration algorithms that may determine a location of the user and the device and migrate the device to an environment corresponding to the determined location. A knowledge graph may be used to support determinations regarding the devices, services, connections, and other aspects of an application session involving the user and a particular peripheral device.

In some embodiments, the aspects described herein may be used to support the execution of gaming applications in different environments. Gaming sessions may execute on a service, either locally on a device, on another system on the network, or in the cloud. A device may access the gaming session by executing an application that communicates with the service to receive and transmit user input to the service and provide feedback to the user from the service. The device may include its own audio/visual (AV) output for displaying a graphical user interface and/or a rendered display from the gaming session. Different environments at a location may include different AV systems, and the device may be automatically paired with an AV system and may be reconfigured to support interaction with an application session using the paired AV system.

A user's home is one example location that may have multiple environments, such as a living room, a dining room, a study, and/or a bedroom, each with different screen configurations, speaker configurations, and/or network availability. Aspects of embodiments disclosed herein may provide a system that enables game play from a set of candidate game hosts and environments to consumption devices of a user's choice while the user moves about their home between the different environments. The system may employ methods to determine where a user is located within the home, availability and selection of candidate game hosting and target environments, homing and direction of related I/O, and/or AV for consumption. The system then migrates the user and their information to the determined environment by coordinating gameplay by the user. The solution accommodates multiple users simultaneously within the home, whether in single player, multiplayer using the same screen, or multiplayer using separate screen games. The solution may configure AV and input/output (I/O) such that multiple users can consume one or multiple games in the home simultaneously, whether in separate locations or when seated together in front of the same consumption device, e.g., a large television, where multiple games might be hosted simultaneously.

The mobility of a user between services and applications for executing an application session may be supported by an information handling system that uses available telemetry from multiple sources to build a confidence-based knowledge graph of the user's gaming environments and determine a position of the user within that graph. A system with knowledge of devices in a user's gaming environment may build a knowledge graph by aggregating and comparing telemetry. For example, network telemetry may reveal that devices are positioned relatively near each other, a mobile device may reveal an absolute location based on GPS data, and/or an infrared presence sensor may reveal that the user is sitting in front a device. An intelligent system may assemble these individual pieces of telemetry into a broader knowledge graph based on the absolute and/or relative locations of the user's devices, the location of the user in relation, and or characteristics of the devices. This knowledge graph may be updated in real time and/or based on changes in device telemetry.

According to one embodiment, a method for execution by an information handling system, such as a hub device, includes receiving, at a first hub device, a connection request from a first peripheral device for initiating an application session; determining first characteristics of the first peripheral device; determining a first service and a first host device for the application session for the first peripheral device based on a knowledge graph and the first characteristics; and/or initiating the application session for the first peripheral device with the first host device and the first service.

In certain embodiments, determining a first service and a first host device for the application session may include determining a first location of the first peripheral device based on the first characteristics of the first peripheral device based on the knowledge graph; and/or determining a first environment corresponding to the first location, wherein the first host device is attached to the first environment.

In certain embodiments, initiating the application session comprises determining the first service is in a second environment different from the first environment; and/or establishing a streaming session between the first host device and the first service.

In certain embodiments, the method may further include receiving, at the first hub device, a connection request from a second peripheral device; determining second characteristics of the second peripheral device; determining a second location of the second peripheral device based on characteristics of the second peripheral device based on the knowledge graph; and/or determining whether the second location corresponds to the first environment, wherein initiating the application session comprises initiating a shared application session with the first peripheral device and the second peripheral device when the first location and the second location both correspond to the first environment.

In certain embodiments, determining first characteristics of the first peripheral device may include determining a first wireless signature comprising one or more Wi-Fi access points, and wherein determining second characteristics of the second device comprises determining a second wireless signature comprising one or more Wi-Fi access points, wherein determining whether the second location corresponds to the first environment comprises determining whether the first wireless signature matches the second wireless signature.

In certain embodiments, when the first location and the second location correspond to different environments, the method may further include determining a second host device corresponding to the second environment based on the knowledge graph; and/or initiating a second application session for the second peripheral device by establishing a streaming session between the first service and the second host device.

In certain embodiments, the method may further include receiving a request for an application as part of the application session; determining a second service for executing the application based on the knowledge graph; and/or migrating the first peripheral device from the first service to the second service.

In certain embodiments, the first hub device executes the first service, and initiating the application session may include: establishing a first communication link between the first peripheral device and the first host device; and/or establishing a streaming session between the first host device and the first service, with the method further including determining a second communication link between the first peripheral device and the first hub device has better characteristics than the first communication link between the first peripheral device and the first host device; and/or migrating the first peripheral device to the second communication link while maintaining the streaming session between the first host device and the first service.

In certain embodiments, the method may further include determining the knowledge graph based on at least one of determining a direction between devices, determining a graph of device locations, determining proximity between devices, determining user locations from device locations, and determining device mobility.

The method may be embedded in a computer-readable medium as computer program code comprising instructions that cause a processor to perform operations corresponding to the steps of the method. In some embodiments, the processor may be part of an information handling system including a first network adaptor configured to transmit data over a first network connection; and a processor coupled to the first network adaptor, and the memory.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

FIG. 6 is a table illustrating two example devices with characteristics according to some embodiments of the disclosure.

FIG. 7 is a table illustrating two example devices with characteristics according to some embodiments of the disclosure.

FIG. 8 is a table illustrating two example devices with characteristics according to some embodiments of the disclosure.

FIG. 9 is a table illustrating two example devices with characteristics according to some embodiments of the disclosure.

DETAILED DESCRIPTION

Figure 1:
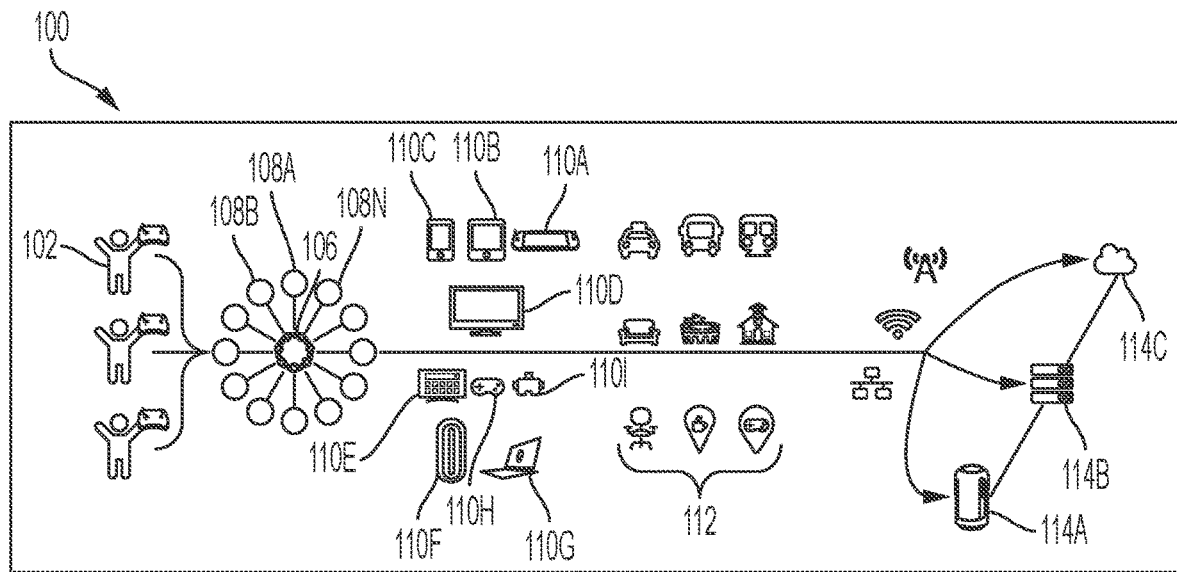
FIG. 1 is a block diagram illustrating aspects of a configurable system for providing services to users according to some embodiments of the disclosure.

These example embodiments describe and illustrate various aspects of a configurable and dynamic gaming environment that can be supported through the use of a hub device, which may be an information handling system. A hub device may be located in a user's home and used to arrange game play sessions (or more generically application sessions) between host devices and services. The host devices may execute an application for receiving an AV stream for displaying rendered content from a game play session (or other application session), and in some configurations also receive user input for interacting with the session from a peripheral device, such as a gaming controller. The AV stream presented by the host device may be generated by a service. The service may execute on the hub device or another information handling system, such as a cloud computing resource. A home may include one or several host devices (e.g., televisions, mobile computers, tablet computers, and personal computers) and may include one or several information handling systems executing the service (e.g., a hub devices and personal computers).

The user's home may be divided into different environments defined by a space around a host device. For example, a living room with a television may be one environment and a bedroom with a personal computer may be another environment. A user may use a peripheral device in one of the environments and the hub device may configure a host device, a service, and the peripheral device for operation in the environment by determining the corresponding environment using a knowledge graph. The knowledge graph provides a database of historical information about the environments from which the hub device may use current characteristics of the peripheral device to deduce the location, and thus current environment, of the peripheral device. For example, the knowledge graph may include information about location of rooms (e.g., environments) in the house based on wireless signatures of devices within the different rooms. This difference in signatures reflects that a device on a one side of the house may receive beacon signals from different neighboring access points than a device on an opposite side of the house. When a user carries the peripheral device around the house, the hub device may determine a location of the peripheral device based on visible access points to the peripheral device. Other example characteristics beyond wireless signature for determining location are described in further detail below, and the knowledge graph may be used to combine different characteristics to identify the location, and thus environment, of the peripheral device.

Based on the location of the peripheral device determined from the knowledge graph, the hub device may initialize an application session for the peripheral device by determining an appropriate host device and service for the application session. For example, if the peripheral device is in the living room and is requesting a game that is within the capabilities of the service on the hub device to execute, the hub device may initialize an application session for the peripheral device between the television as a consumption device and the hub device as a service. The service on the hub device executes the game and streams rendered content to an application executing on the television consumption device.

The hub device may be used to migrate the peripheral device to a different environment and/or migrate the application session between host devices and/or services. For example, initially the application session may use a communication link between the peripheral device and the television host device for receiving user input, in which the application executing on the television host device relays user input to the service through a backhaul communication link from the television host device to the hub device. During the application session, the hub device may monitor characteristics of the peripheral device, including signal strength of connection to other components, and determine that the communication link from the peripheral device to the hub device is stronger than the peripheral device to the television host device. The hub device may migrate the peripheral device to a communications link with the hub device such that the service executing on the hub device directly receives the user input but the streaming session continues from the service to the application executing on the television host device. Such a change is illustrated in the change in configuration from FIG. 3A to the configuration of FIG. 3B described in further detail below.

Other aspects of the application session may also be migrated. For example, if the peripheral device is determined to move to a different environment, then the hub device may migrate the application session to an application executing on a host device within the new environment. As another example, if a connection between the television host device and the service becomes unstable, the hub device may recommend and/or initiate a migration of the application session to a different host device. One scenario for such a migration may be where the television host device is connected through a wireless link to the service in which the wireless link quality is reducing quality of the streaming and a second host device with a wired connection is available in a nearby environment. Each of these example migrations may be determined based on information in the knowledge graph regarding locations of environments and capabilities within those environments. As yet another example, a user may request execution of an application, such as a particular game, during the application session for which a better configuration exists than the current host device and/or current service. The request for a different application, such as a game requiring a certain GPU capability, may cause the hub device to determine that a second device executing a second service is better for hosting the application and migrate the peripheral device to the second service by, for example, reconfiguring network connections.

The hub device may support connecting to multiple peripheral devices. In one example, the hub device may support two peripheral devices using a shared session on one host device to play the same or different games on the host device. In another example, the hub device may support two peripheral devices in different environments using different sessions with different host devices. The hub device may determine the environment of each of the peripheral devices based on characteristics of the device and the knowledge graph and configure application session for each of the peripheral devices accordingly. Different arrangements of peripherals and players may be supported. For example, one hub device executing a service and one host device executing an application can support a configuration with Game A and one player (P1) with peripheral (C1 and Game B and one player (P2) with peripheral (C2); or can support a configuration with Game A and one player (P1) with peripheral (C1) and Game A and one player (P2) with peripheral (C2); or can support a configuration with Game A and two players (P1, P2) with peripherals (C1, C2).

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

FIG. 1 is a block diagram illustrating aspects of a configurable system for providing services to users according some embodiments of the disclosure. A system 100 includes users 102 who may have access to a shared library of applications 106 including applications 108A-108N. The users 102 may have separate libraries, with some overlapping applications between the libraries. The users 102 may access the library 106 through devices 110A-I, such as mobile gaming device 110A, tablet computing device 110B, phone computing device 110C, television 110D, personal computing device 110E, desktop computing device 110F, laptop computing device 110G, game controller 110H, VR headset 110I. The devices 110 may access services at any of locations 112, including cars, busses, homes, hotels, offices, parks, etc. One or more of the devices 110 may communicate with an application session executing on a computing device 114, such as a home application hub 114A, a server 114B, or a cloud execution environment 114C. In some embodiments, environments may only exist for fixed devices, e.g., desktop computers, televisions, etc.

Figure 2:
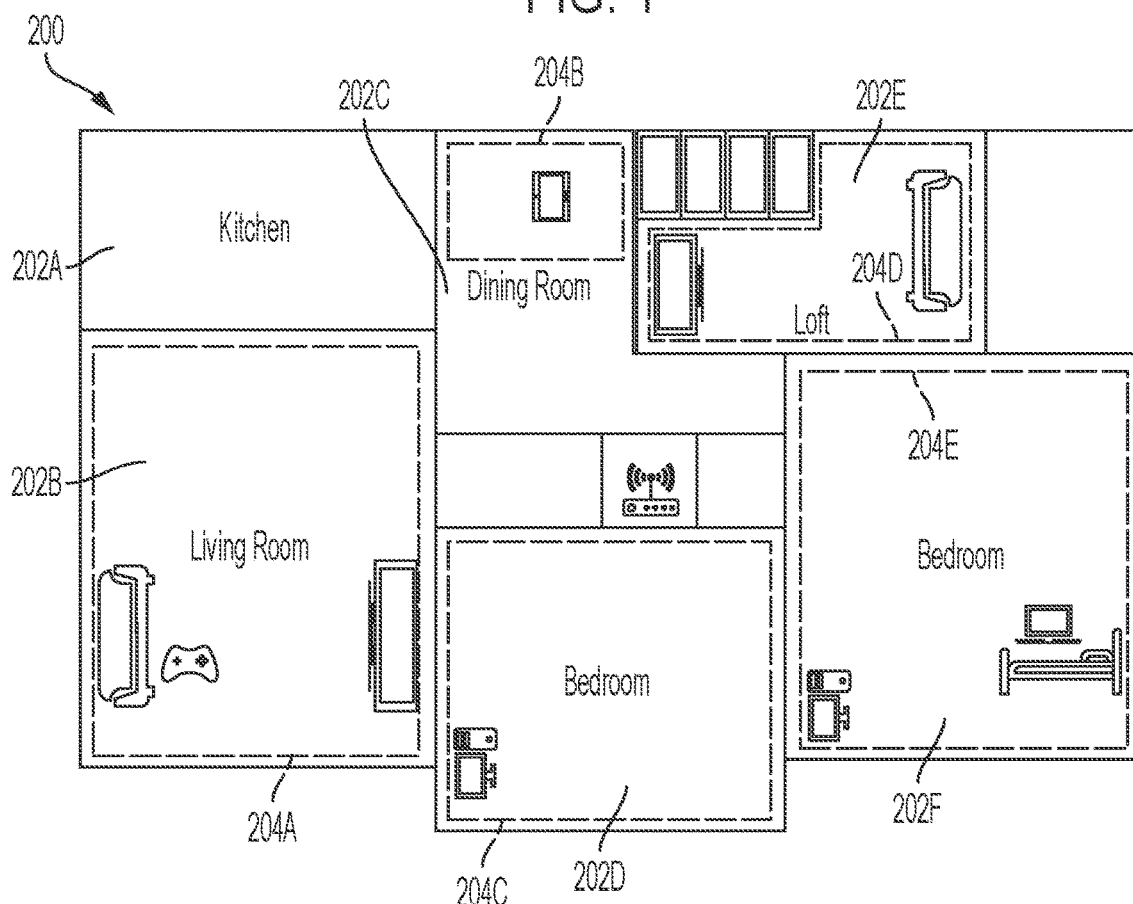
FIG. 2 is a block diagram illustrating possible game environments according to some embodiments of the disclosure.

FIG. 2 is a block diagram illustrating possible game environments according to some embodiments of the disclosure. A user's home 200 may include rooms 202A-F, and each of the rooms may have different information handling systems present, different AV equipment present, and/or different characteristics. For example, a living room 202B may include a large-size television, a bedroom 202D may include a personal computer, and a dining room 202C may include a table computing device. Gaming environments 204A-E in the home 200 may be defined based on spaces where a user is likely to execute an application session. Each gaming environment 204A-E may include numerous devices and gaming environments, devices that may or may not be capable of hosting games, and/or devices that may or may not be capable of receiving game output. A system 100 may allow multiple users in the home 200 to simultaneously execute an application session. In some embodiments, multiple games may be hosted on a single device. In some embodiments, multiple games may target a single output device. In some embodiments, solution manages where games should be hosted, where game output should go, and how to best route peripheral I/O for users.

A user may move between gaming environments 204A-E within the home 200 and continue an application session. For example, a user may take a device, such as a gaming controller, from environment 204A to environment 204C. The gaming controller may migrate and reconfigure for operation in environment 204C from a configuration for environment 204A. For example, the controller may transition from an application hosted on a TV in living room 202B to an application hosted on TV in dining room 202C while remaining connected to a host service executing on a PC in bedroom 202D.

Figure 3A:
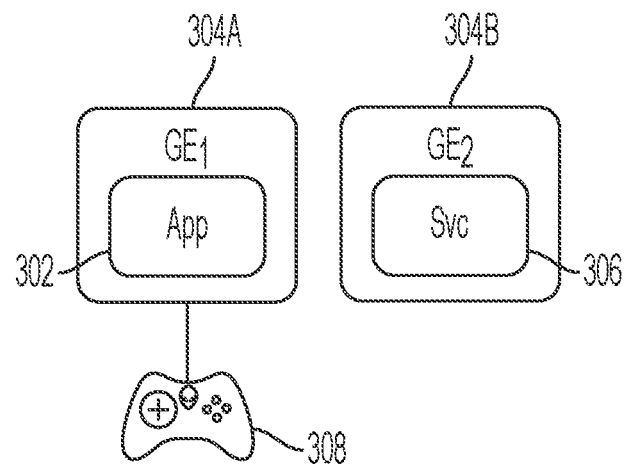
FIG. 3A is a block diagram illustrating application and services hosted in different gaming environments according to some embodiments of the disclosure.

Example configurations for applications and services in gaming environments are shown in FIGS. 3A-3D. FIG. 3A is a block diagram illustrating application and services hosted in different gaming environments according to some embodiments of the disclosure. In FIG. 3A, a first gaming environment 304A may include a device, such as a TV or PC, hosting an application 302, which is an endpoint for an application session such as a gaming session. The application 302 communicates with a service 306, which may be hosted on a device in a different gaming environment 304B. A controller 308 may communicate with the application 302 to receive user input for the application session to control, for example, a character in a game. In some embodiments, the controller 308 is connected to the environment 304A hosting the application and the I/O is configured to be relayed to the environment 304B hosting the actual game.

Figure 3B:
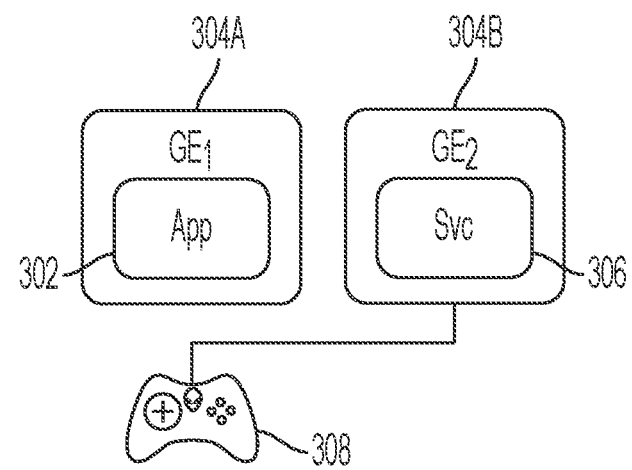
FIG. 3B is a block diagram illustrating application and services hosted in different gaming environments according to some embodiments of the disclosure.

Another arrangement for the application and service is shown in FIG. 3B. FIG. 3B is a block diagram illustrating application and services hosted in different gaming environments according to some embodiments of the disclosure. In FIG. 3B, the controller 308 communicates with the service 306 for providing user input to an application session, with the AV rendering target of the application session being application 302 in a different gaming environment.

Figure 3C:
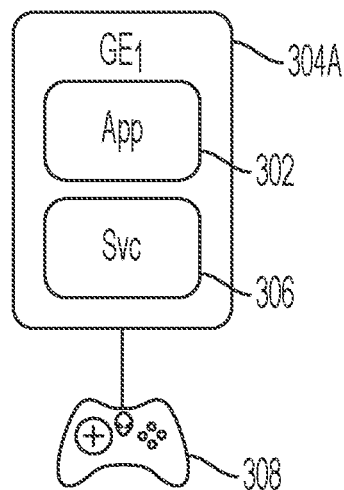
FIG. 3C is a block diagram illustrating application and service hosted in a common gaming environment according to some embodiments of the disclosure.

Another arrangement for the application and service is shown in FIG. 3C. FIG. 3C is a block diagram illustrating application and service hosted in a common gaming environment according to some embodiments of the disclosure. In FIG. 3C, the application 302 and the service 306 are executed in the same gaming environment 304A, which may be a single device, two devices, or a combination of devices in the gaming environment 304A. The controller 308 may communicate with either the service 306 and/or the application 302.

Figure 3D:
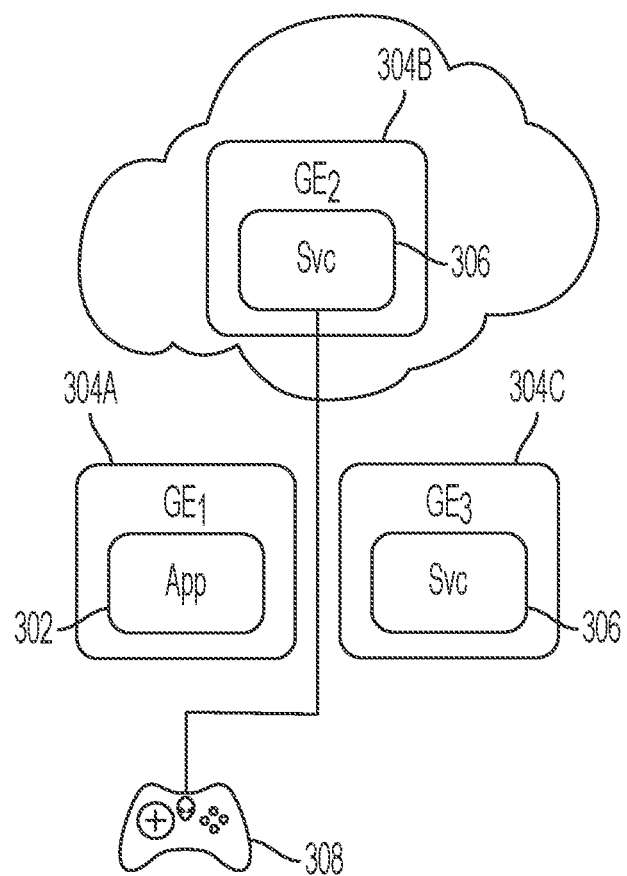
FIG. 3D is a block diagram illustrating a cloud-based service arrangement for a gaming environment according to some embodiments of the disclosure.

A further arrangement for the application and service is shown in FIG. 3D. FIG. 3D is a block diagram illustrating a cloud-based service arrangement for a gaming environment according to some embodiments of the disclosure. In FIG. 3D, the controller 308 may communicate with a service 306 hosted in a gaming environment 304B that is remote from the gaming environment 304A in which the application 302 is executing. The service 306 may be executing, for example, on a remote device, such as when the user's home includes the gaming environment 304B but the user is engaging with application 302 at a location on a different network from their home (e.g., at a friend's house). The service 306 may also or alternatively be executed, for example, on a cloud computing device available as a subscription service to the user.

Figure 4:
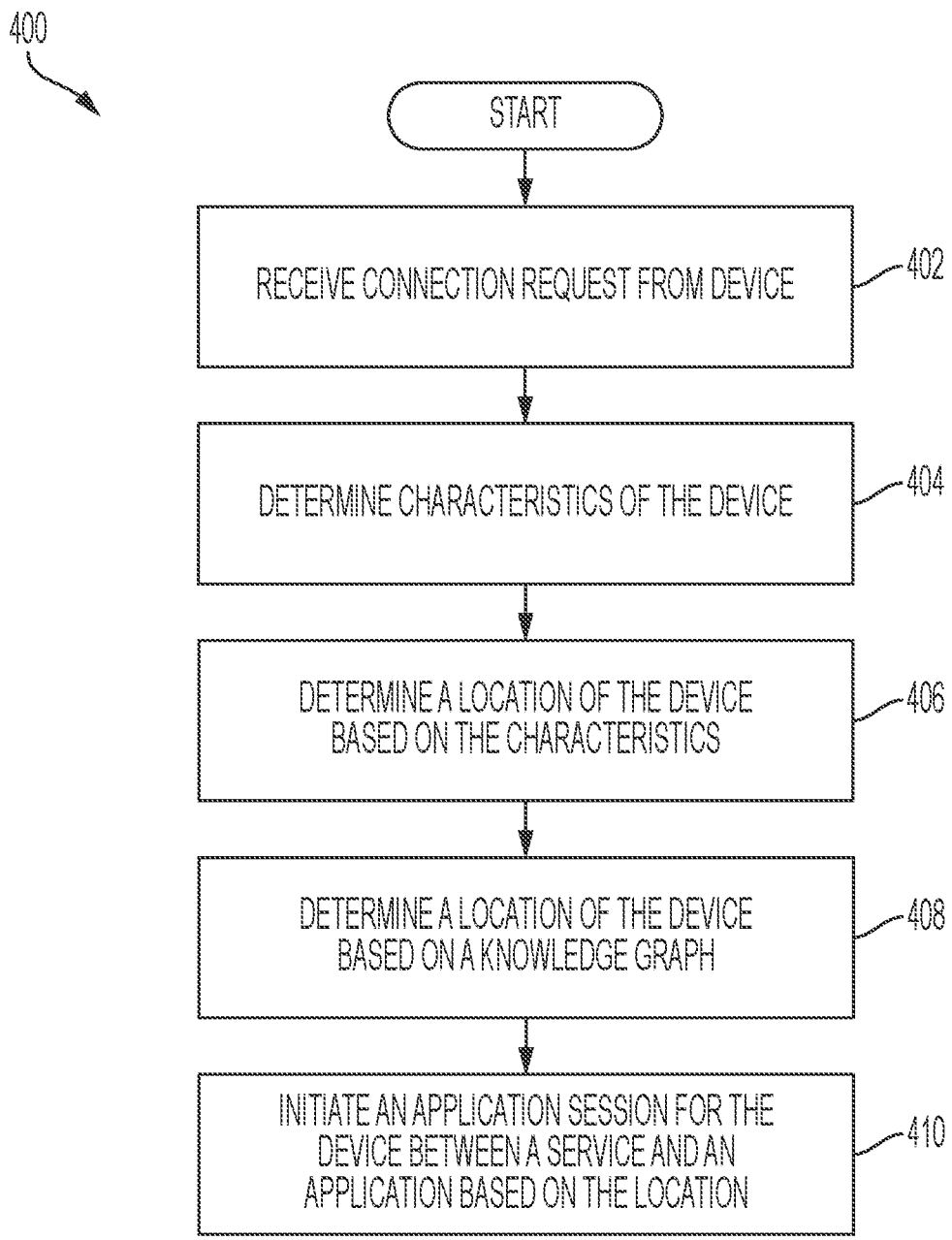
FIG. 4 is a method of establishing an application session for a user according to some embodiments of the disclosure.

Embodiments of this disclosure provide for determining a configuration of a gaming environment around a user based on, for example, determining a location of the user with respect to devices and gaming environments. The user may be migrated to that environment for the execution of an application session. One example method for operating a service on a hub that facilitates the establishment and configuration of gaming sessions is shown in FIG. 4. FIG. 4 is a method of establishing an application session for a user according to some embodiments of the disclosure. A method 400 includes at block 402 receiving a connection request from a device. For example, a user may start an application executing on a TV in the living room and connect to a service executing on a hub device. As another example, a user may start an application executing on their mobile device in the bedroom and connect to a service executing on a hub device.

At block 404, characteristics of the device are determined. Characteristics may include one or more of physical connections, physical location (e.g., GPS coordinates), IP address, Bluetooth devices in range, ultra-wideband connections available, ultrasonics detected, access points (APs) in range, infrared sensor received data, camera images, microphone audio input, biometric sensor input, eye tracking input, accelerometer input, gyroscope input, device metadata (e.g., type of device, brand of device, model number of device, primary user of the device, capabilities of the device, etc.), and user behavior.

At block 406, a gaming environment of the device is determined based on the device characteristics determined at block 404 and a knowledge graph. The gaming environment may be a physical location or a relative location to other devices and/or users. The determining of the gaming environment may include determining a configuration of devices for executing an application and a service. The knowledge graph may be a database of game environments, users, and devices. The knowledge graph may be a static database created by a user. The knowledge graph may alternatively be a dynamic database that is trained over time using inputs and feedback from devices. The knowledge graph may be stored on a hub device, such as a hub in the user's home and/or a hub hosted in the cloud for the user. The knowledge graph may be constructed as described in aspects of FIG. 5. The determination at block 406 may include, for example, one or more of determining a device D1 is within range R of another device D2, determining device D is within range R of user U, determining user U is within range R of user U2, determining device D1 is at bearing B to device D2, determining device D is at bearing B to user U, determining user U1 is at bearing B to user U2, determining device D is at location L, determining user U is at location L, determining user U is using device D, determining device D1 acts in tandem with device D2, determining device D acts in tandem with user U, determining device D is in game space S, and/or determining location L represents game space S.

At block 408, an application session may be initiated for the device between a service and an application based on the gaming environment. For example, a communication session may be established between the application and the service to provide for the rendering of AV content on a device hosting the application. In some embodiments, the device hosting the application may be determined based on a personal preference of devices, such as when a user is in close proximity to two devices and a preference is used to choose between those two devices. Additionally or alternatively at block 408, a communication session may be established between the application and a controller or between the service and a controller for receiving user input and/or providing feedback (e.g., haptic feedback) to the user. The application session may be hosted on a hub device executing the service using hardware of the hub device, such as a central processing unit (CPU) or graphics processing unit (GPU). In some embodiments, the application session may be a gaming session that receives user input from the controller to control a character or other aspect of the gaming session and the GPU of the hub device renders a scene of the gaming session for output to an application executing on a device with a display, such as a mobile device, personal computer, or television.

Figure 5:
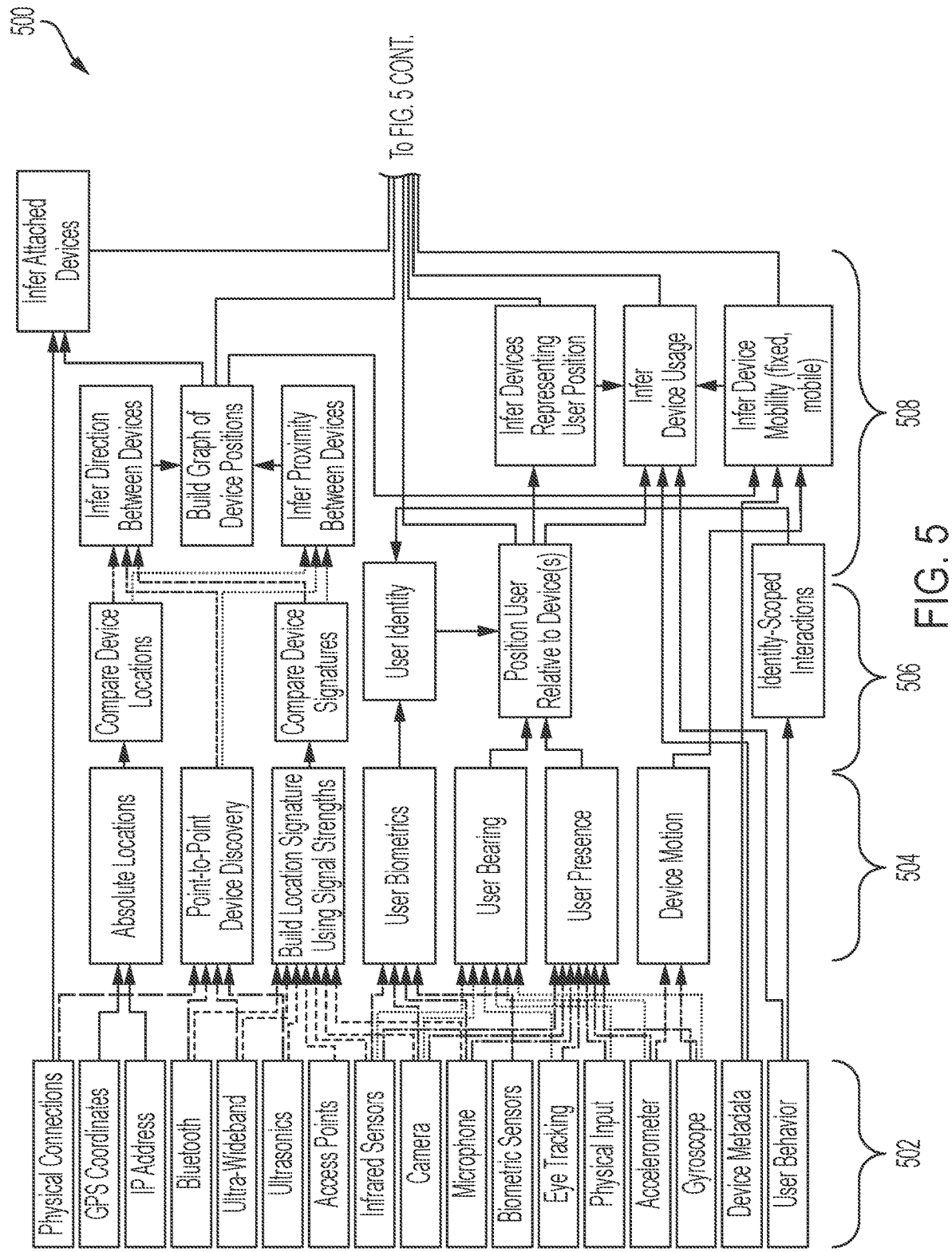
FIG. 5 is a block diagram illustrating the training and use of a knowledge graph of game environments, users, and/or devices according to some embodiments of the disclosure.

The knowledge graph is described in more detail with reference to FIG. 5. FIG. 5 is a block diagram illustrating the training and use of a knowledge graph of game environments, users, and/or devices according to some embodiments of the disclosure. A system 500 may include input data 502 processed through blocks 504 and blocks 506 and blocks 508 to train a knowledge graph 510. The knowledge graph 510 may be trained to identify relationships between gaming environments, users, and/or device as shown in outcomes 512. Although many example inputs, processes, and outcomes are shown in FIG. 5, a knowledge graph 510 may be trained with different combinations of the illustrated examples.

Examples of input data 502 regarding a device may include one or more of physical connections, physical location (e.g., GPS coordinates), IP address, Bluetooth devices in range, ultra-wideband connections available, ultrasonics detected, access points (APs) in range, infrared sensor received data, camera images, microphone audio input, biometric sensor input, eye tracking input, accelerometer input, gyroscope input, device metadata (e.g., type of device, brand of device, model number of device, primary user of the device, capabilities of the device, etc.), and user behavior.

The input data 502 collected by or from a device may be processed in blocks 504 to determine one or more of an absolute location, point-to-point discovery, a location signature using signal strengths of nearby devices, user biometrics, user bearing, user presence, and/or device motion. The processing at blocks 504 may be inputs to further processing at blocks 506 that includes, for example, comparing device locations, comparing device signatures, determining a user identity, and/or determining a position of user relative to device(s). The output of processing at blocks 504 and/or 506 may be input to further processing of blocks 508. The processing at blocks 508 may include, for example, determining a direction between devices, determining a graph of device positions, determining proximity between devices, determining devices representing user position, determining device usage, and/or determining mobility (e.g., whether a device is fixed or mobile). The output of processing blocks 508 may be used to train a knowledge graph 510. The knowledge graph 510 may be determined, for example, for users subscribed to a common hub, users in a common area, or an otherwise specified list of users. The knowledge graph 510 may be a database associating items, such as devices with users, users with other users, users with gaming environments, devices with gaming environments, users with devices, etc. In some embodiments, the knowledge graph 510 may be neural network or other artificial learning system trained using the input from blocks 502, 504, 506, and 508 and/or with feedback from users.

The knowledge graph 510 may be used to determine outcomes 512. For example, outcomes 512 may include determining a device D1 is within range R of another device D2, determining device D is within range R of user U, determining user U is within range R of user U2, determining device D1 is at bearing B to device D2, determining device D is at bearing B to user U, determining user U1 is at bearing B to user U2, determining device D is at location L, determining user U is at location L, determining user U is using device D, determining device D1 acts in tandem with device D2, determining device D acts in tandem with user U, determining device D is in game space S, and/or determining location L represents game space S.

Example inputs and outcomes determined by knowledge graph, such as knowledge graph 510, are described with reference to FIG. 6, FIG. 7, FIG. 8, and FIG. 9.

FIG. 6 is a table illustrating two example devices with characteristics according to some embodiments of the disclosure. Device 602 includes several characteristics that are determined by a hub and listed in the first row of the table, and device 604 includes several characteristics that are determined by a hub and listed in the second row of the table. A hub may determine, for example, that device 602 and device 604 share an external IP address indicating that the devices are located in the same home. The hub may also determine that device 602 and device 604 are Bluetooth discoverable to each other indicating the devices are within range of each other. The hub may also determine that device 602 and device 604 have different WiFi signatures (combining one or more of in-range access points (APs), signal strengths of the APs, which node in a mesh network is connected to the device) indicating the devices are located in different rooms. From the determined characteristics for device 602 and device 604, the hub may determine from a knowledge graph with a medium confidence that device 602 is not located in device 604's environment (e.g., room).

FIG. 7 is a table illustrating two example devices with characteristics according to some embodiments of the disclosure. Device 702 includes several characteristics that are determined by a hub and listed in the first row of the table, and device 704 includes several characteristics that are determined by a hub and listed in the second row of the table. A hub may determine, for example, that device 702 has an absolute location sensor that associates the location with device 702 and the home. The hub may also determine that user 1 is interacting with device 704 indicating that user 1 shares location with device 704. The hub may also determine that device 702 recognizes user presence indicating that user 1 is within range of device 702. From the determined characteristics for device 702 and device 704, the hub may determine from a knowledge graph with high confidence that user 1, device 702, and device 704 are co-located in an environment (e.g., a room).

FIG. 8 is a table illustrating two example devices with characteristics according to some embodiments of the disclosure. Device 802 includes several characteristics that are determined by a hub and listed in the first row of the table, and device 804 includes several characteristics that are determined by a hub and listed in the second row of the table. A hub may determine, for example, that device 802 has a past inference that indicates device 802 represents user 1's location. A hub may also determine that device 804 has a past inference that indicates device 804 is located in a first environment. The hub may also determine that device 802 has a GPS coordinate update and an active WiFi connection indicating that device 802 has entered the first environment. The hub may further determine that device 802 represents user 1's location indicating that user 1 has entered the first environment. The hub may also determine that device 804 has accelerometer activity indicating that device 804 has been picked up by an unknown user. From the determined characteristics for device 802 and device 804, the hub may determine from a knowledge graph with high confidence that device 804 has been picked up by user 1.

FIG. 9 is a table illustrating two example devices with characteristics according to some embodiments of the disclosure. Device 902 includes several characteristics that are determined by a hub and listed in the first row of the table, and device 904 includes several characteristics that are determined by a hub and listed in the second row of the table. A hub may determine, for example, that device 902 motion and WiFi signature change indicating that device 902 has entered a first environment. The user 1 may use a voice command to request gameplay. The hub may also determine, for example, that device 902 recognizes user 1's voice indicating that device 902 represents user 1's location. The hub may further determine that device 902 represents user 1's location indicating that user 1 is located in the first environment. From the determined characteristics for device 902 and device 904, the hub may determine from a knowledge graph with high confidence that user 1 wishes to play a game on device 904.

Figure 10:
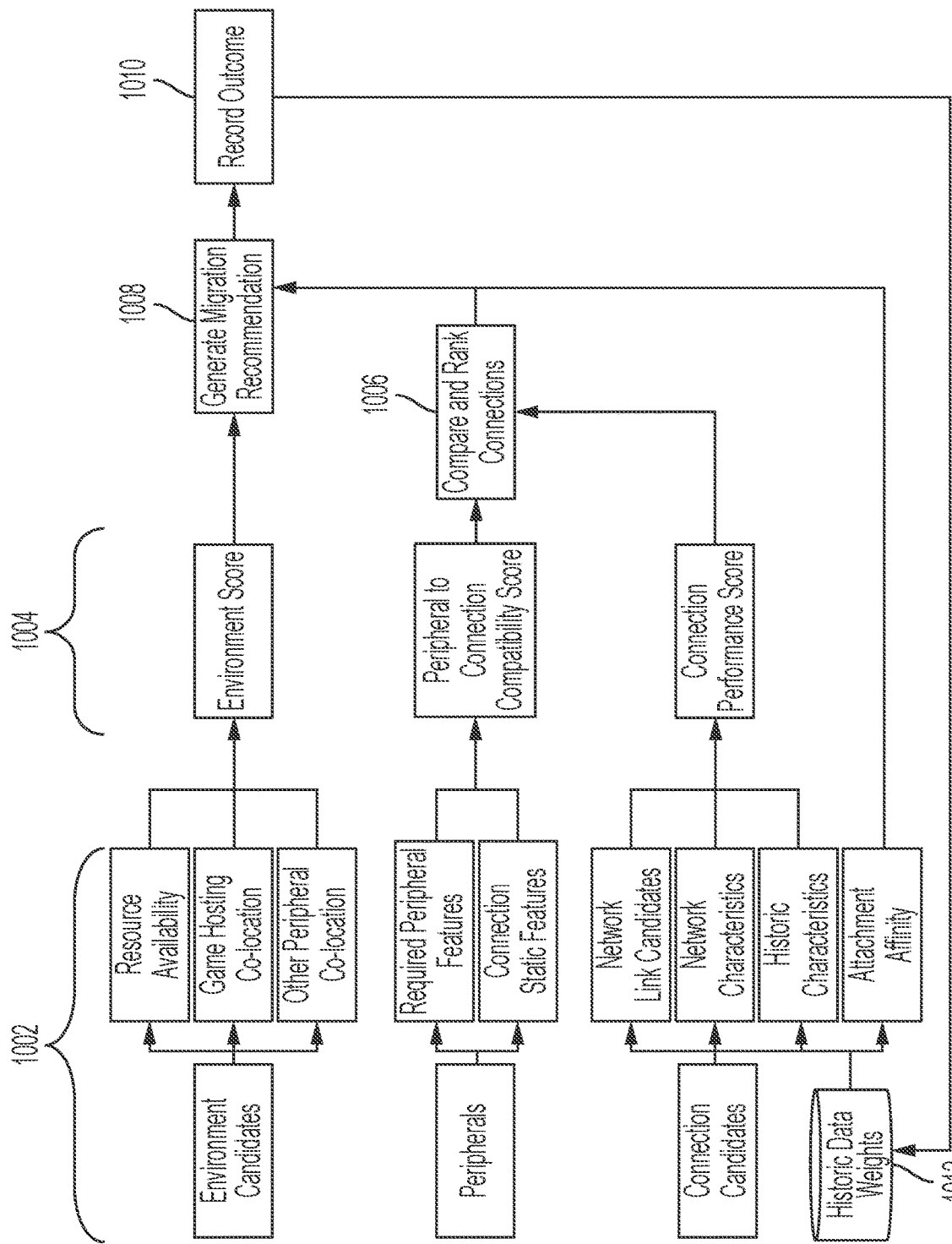
FIG. 10 is a block diagram illustrating generating a migration recommendation according to some embodiments of the disclosure.

Using a knowledge graph or another indication of relationships, a migration may be recommended for how a user should initiate an application session, and that recommendation may be implemented by reconfiguring the devices involved in the migration (such as a controller, device executing an application, and/or a device executing a service). FIG. 10 is a block diagram illustrating generating a migration recommendation according to some embodiments of the disclosure. A recommendation may be generated using historic data weights 1012, which may be updated based on past recommendations. Characteristics 1002 used for determining recommendations may include environmental candidates (e.g., resource availability, game hosting co-location, and/or other peripheral co-locations), peripherals (e.g., requested/desired/required peripheral features and/or connection static features), and/or connection candidates (e.g., network link candidates, network characteristics, historic characteristics, and/or attachment affinity). The characteristics 1002 may be used to determine one or more scores 1004, such as an environment score for each possible environment, a peripheral-to-connection compatibility score for each possible peripheral, and/or a connection performance score for each possible connection. A migration recommendation may be generated at block 1008 based on one or more of the scores 1004. For example, forming a recommendation may include, at block 1006, comparing and ranking connections based on the connection performance score and the peripheral-to-connection compatibility score. Using the ranked connections and the environmental scores, along with information relating the connections to the environments in a knowledge graph, a migration recommendation is generated at block 1008, recorded at block 1010, and used as feedback into the historic data weights 1012. Based on the recorded recommendation of block 1010, an application session for a device in an environment (e.g., a location) between an application and a service may be established.

Some example processes involved in the execution of an application session, such as for a gaming session, are described with reference to FIG. 11, FIG. 12, FIG. 13, and FIG. 14.

Figure 11:
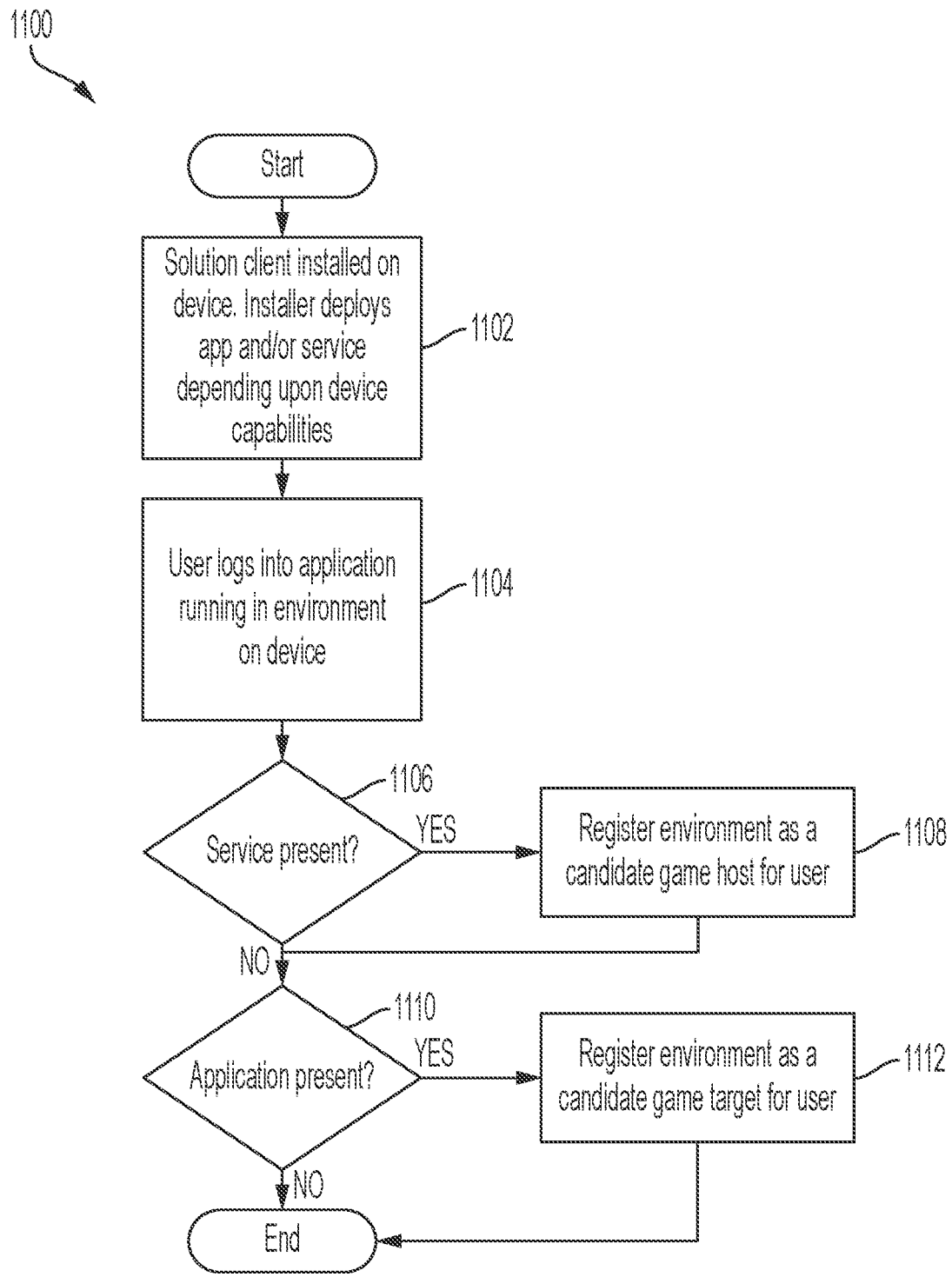
FIG. 11 is a flow chart illustrating an example method for host and target registration according to some embodiments of the disclosure.

FIG. 11 is a flow chart illustrating an example method for host and target registration according to some embodiments of the disclosure. At block 1102, a client is installed on a device and deploys as either an application (e.g., target) or a service (e.g., host). A system may register a gaming device and environment with a set of solution services hosted in the cloud in order to make the environment available to users for gameplay. The client-side architecture may include two components: an application and a service. Software for the system may be made available through, for example, a pre-installation on a device, a download from cloud, and/or a digital marketplace. Once downloaded onto a device in the environment, the software installer may make the system components available and allow a user to take appropriate action. In some embodiments, the hub may deploy the software to other devices.

At block 1104, a user may log into the application executing on a device in an environment. Block 1104 may include, for example, a hub executing a service receiving the user login. As the user logs into a device, if the service component is present it registers the environment with gaming services as a candidate game host. If the application component is present it registers the environment with gaming services as game target for the user, as described below with reference to blocks 1106, 1108, 1110, and 1112.

At block 1106, the device or hub may determine for the device where the user is logged in whether a service component is present when an environment running on a device is capable of acting as a game host for a user. These may or may not host video and audio outputs. They might also support hosting of gaming inputs such as a gaming controller or keyboard and mouse. Examples include a desktop, a laptop, or a gaming appliance that is capable of supporting one or more games concurrently.

At block 1110, the device or hub may determine for the device where the user is logged in whether an application component is present when an environment including the device is capable of acting as an application session consumption point for a user. A device executing the application may be determined to be capable of outputting AV and/or be capable of receiving inputs such as from a gaming controller or keyboard and mouse. Examples of a device for an application may include a desktop with an attached monitor and speakers, a tablet device, or a smart television or television with an attached dongle/device capable of supporting the application.

Depending on the outcomes of determinations at blocks 1106 and 1110, registration at blocks 1108 and/or 1112 may be performed. An environment running on a device may support the application, service, or both components. The environment around the device may be ready after the registration process for game hosting and/or consumption.

Figure 12:
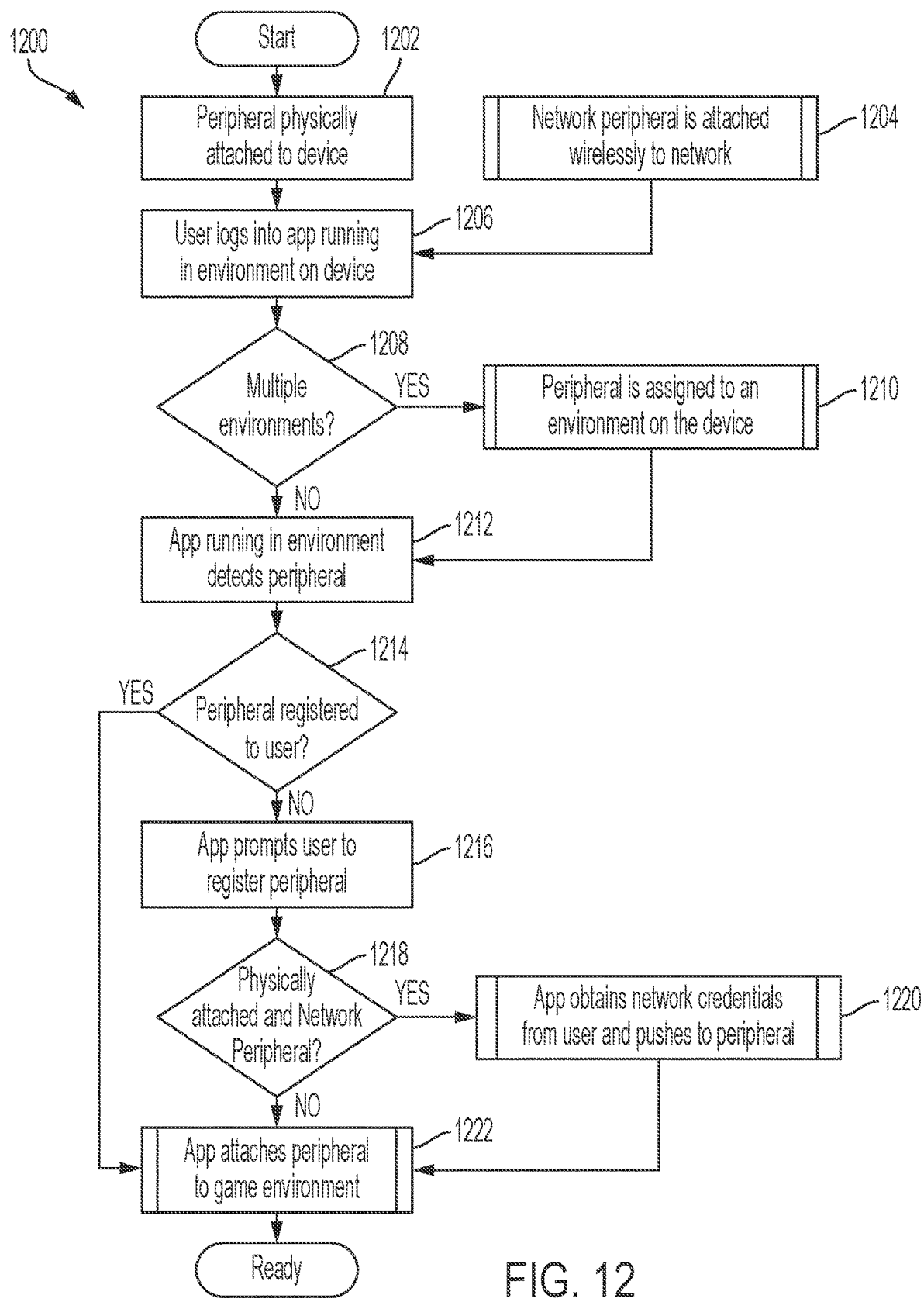
FIG. 12 is a flow chart illustrating an example method for peripheral registration according to some embodiments of the disclosure.

FIG. 12 is a flow chart illustrating an example method for peripheral registration according to some embodiments of the disclosure. The system may register gaming or other peripherals through a hub or device. Registration may include attaching the peripheral to a user and attaching it to a gaming environment on a gaming device. At block 1102, a peripheral may be determined by an application to be physically attached to a device. At block 1104, a peripheral may be determined by an application to be wirelessly attached to a network. Peripherals can be physically tethered to a gaming device, e.g., through a wired USB connector or wirelessly via a physical USB dongle. Peripherals can also be networked, e.g., reachable over an IP based network via an assigned IP address.

At block 1206, a user logs into an application in a gaming environment that is hosted on the device via which the peripheral will be registered. If there are multiple gaming environments present at block 1208, the peripheral may be attached to one of them at block 1210 through several techniques, such as by always selecting a default environment, using user input on the device to select a gaming environment, e.g. button A is env 1, button B is env 2, etc., using a mechanism on the host device to select a gaming environment, e.g., the red button selects env 1, the blue button selects env 2, and/or presenting an interface that allows the user to assign a peripheral to an environment.

After the peripheral is assigned to an environment, the application executing in the environment detects the peripheral at block 1212, and at block 1214 checks with services to determine if the peripheral is already registered to the user. If the peripheral is not registered, the application prompts the user, at block 1216, to register the peripheral and may walk them through configuration, e.g., whether the peripheral is to be networked but physically attached to the device at block 1218, such that at block 1220 the user might provide network credentials to the peripheral so that it can attach wirelessly to the network.

At block 1222, the application then attaches the peripheral to the game environment. In the case of a physically attached peripheral, the peripheral may be made available as a device within the environment via a supporting driver and becomes visible by the operating system, application, and other software and libraries supporting the peripheral presence, management, and use. In the case of a networked peripheral, the application determines a method to contact the peripheral by scanning the network looking for peripherals, and using a URL or other network address to communicate with them, contacting solution services to request the address of the peripheral, contacting the peripheral and directing it to communicate with an endpoint hosted in the game environment, relays I/O and making the peripheral available as a device within the environment via supporting driver, and/or creating a virtual representation of the attached device for remoting I/O and binding it to the peripheral.

Figure 13:
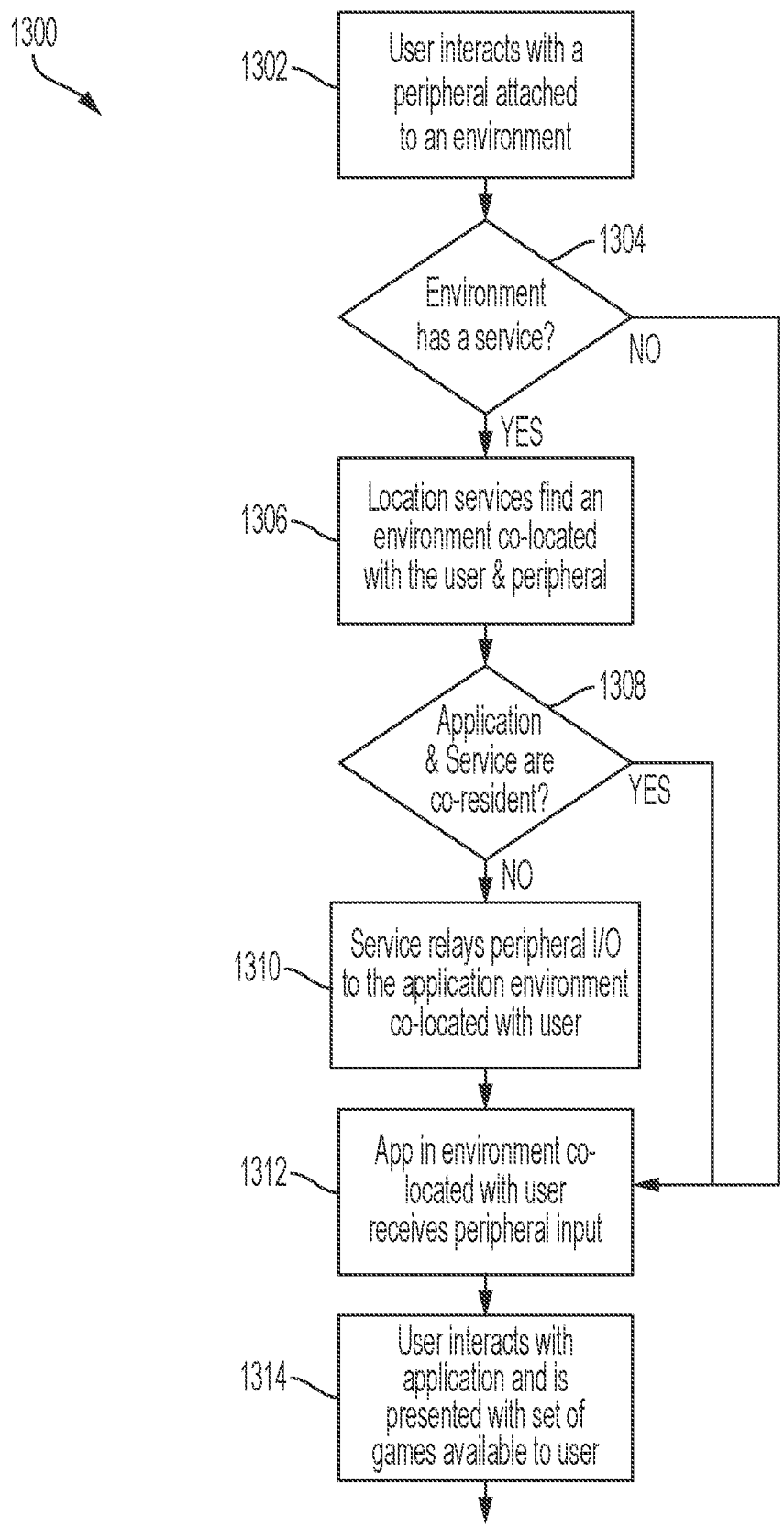
FIG. 13 is a flow chart illustrating an example method for executing an application session according to some embodiments of the disclosure.

FIG. 13 is a flow chart illustrating an example method for executing an application session according to some embodiments of the disclosure. At block 1302, a user interacts with a peripheral attached to an environment, such as may be detected by an application executing in the environment. It may be assumed that game environment and device host and target registration has occurred with gaming services such that available environments for a given set of users is known. It is also assumed that peripherals have already been registered via an application and are available for use.

At block 1304, the application determines if the environment has an assigned service. If so, the method continues to block 1306 to find an environment co-located with the user and peripheral.

Blocks 1304, 1306, and 1308 may execute to determine a configuration of a gaming session that is implemented through blocks 1310, 1312, and 1314. If the environment receives input and does not support a service, then the controller is attached to a game target and the application receives input supporting a configuration similar to shown in FIG. 3A. If the environment is receiving input and a service is present, then using use the knowledge graph from FIG. 5 as described above to determine the application environment, determine the application environment co-located with the user. If the application environment determined at block 1306 and the service are co-resident then the solution may be similar to FIG. 3C. If the application and service are not co-located then the solution may be the configuration shown in FIG. 3B or FIG. 3D.

If the supported configurations are FIG. 3B and 3D, then the peripheral is attached to an environment that isn't co-located with the user and the service resident in that environment must forward the I/O to the environment that is co-located with the user and hosting the application that the user will see/consume. At block 1314, after I/O is appropriately directed to the application in the target environment, the user can then interact with the application using the peripheral and is presented a list of games to consume and select from.

Figure 14:
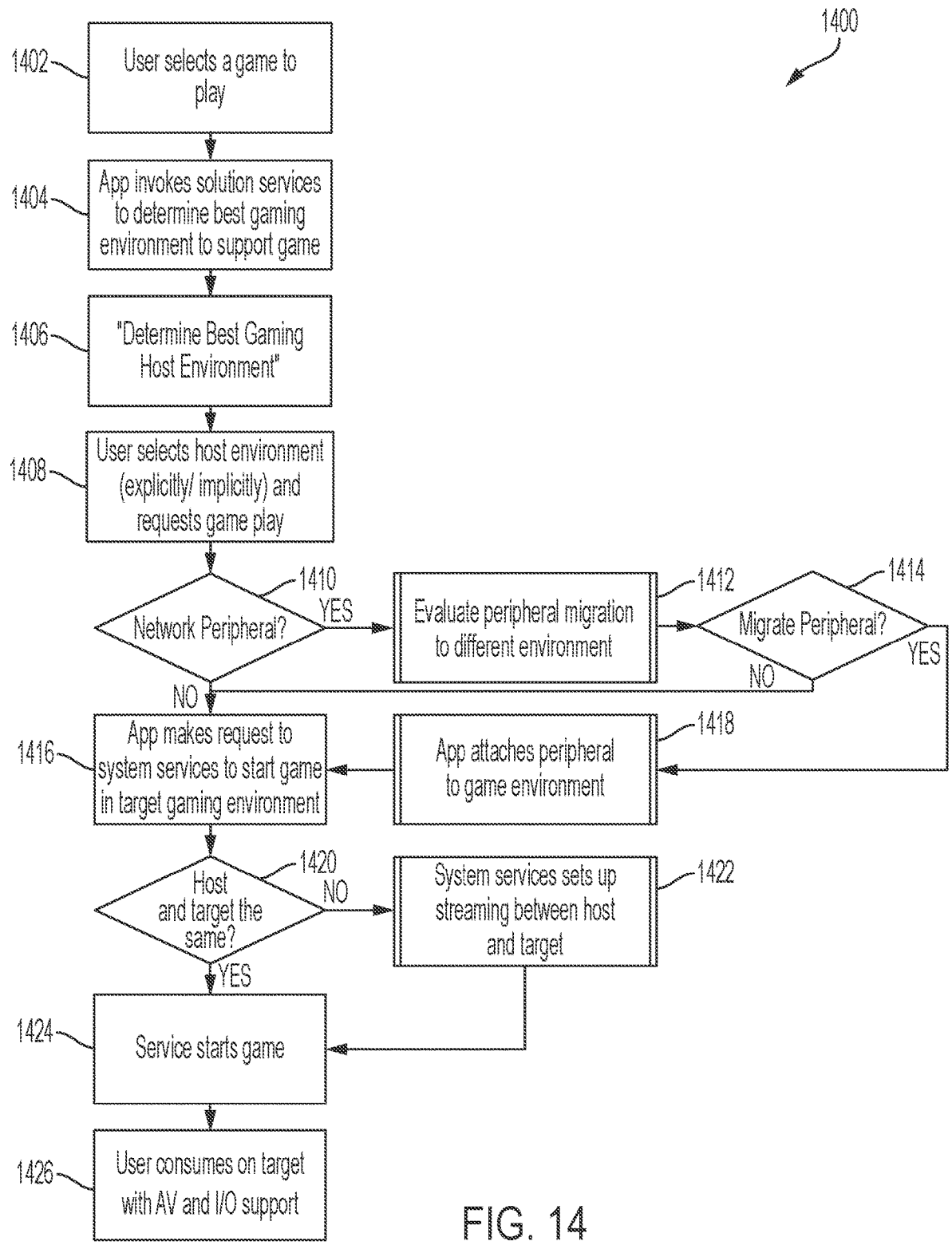
FIG. 14 is a flow chart illustrating an example method for executing an application session according to some embodiments of the disclosure.

The gaming session begun through the process of FIG. 13 or another process may continue execution by an application through the method shown in FIG. 14. FIG. 14 is a flow chart illustrating an example method for executing an application session according to some embodiments of the disclosure. At block 1402, the application receives a user selection of a game to play from the list presented by the application. The best gaming host environment in which to run the game may be determined at block 1406, such as through use of the knowledge graph generated in FIG. 5 and/or the migration process shown in FIG. 10. At block 1408, the application receives a user choice for the hosting an environment either implicitly or explicitly and requests game play from the service.

At block 1410, the application determines if the peripheral is a network peripheral, and if so proceeds to block 1412, to determine if the peripheral should be migrated to a different environment as an optimization. Evaluation of migration consists of several factors including whether the environment is capable of supporting additional peripherals, whether the environment and peripheral are reachable via the network, whether the peripheral and its supporting driver would be co-located with the hosted game, whether there is an attachment affinity and performance history, and whether improvements due to connection medium, e.g., wired over Wi-Fi, 5g over Wi-Fi, power states, bandwidth, etc. In some embodiments the application may make the determination, while in other embodiments the application may be provided a decision from a service. If, at block 1414, it is determined that the network peripheral should be migrated to a different environment, then at block 1418 it determines a method to contact the peripheral, such as by obtaining a peripheral address from a cloud registry or locating the peripheral on the network. In some embodiments, certain endpoint links may be kept open to allow switching between environments, such as when one game host service is consistently better than another for certain titles.

At block 1416, the application then makes a request to gaming service to start the game in the host gaming environment. At block 1420 it is determined whether the application and service are co-located, in which case no network streaming services are used to connect the application and service for communication during the application session. If so, the method continues to block 1424 to start the application session, such as a game involving the user. Co-location may be a configuration for a local consumption use case wherein a user is at a laptop or desktop playing a game hosted by the laptop or desktop. If at block 1420, it is determined that the application and service are not co-located then the application at block 1422 initiates an I/O and A/V stream between the two environments of the application and service. No co-location may be a configuration for a remote use case wherein a user is located at a television and wants to consume a game hosted in a service at a desktop computer in another room in the home or at a hub device in the home. At block 1426, the service then starts the game session, and the user consumes AV and uses the available I/O on the peripheral to control and interact with the game Systems implementing aspects of the techniques described above enable game play from a set of candidate game hosts (e.g., services) and environments to consumption devices of a user's choice while they move about their home (e.g., between endpoint applications executing in different environments). The system employs methods to determine where a user is located within the home, the availability and selection of candidate game hosting and target environments for service and application components, homing and direction of related I/O and AV for consumption by applications, and then coordinates, optimizes, and articulates the solution to enable optimal gameplay by the user. The solution accommodates multiple users simultaneously within the home, whether in single player, multiplayer same screen, or multiplayer separate screen games and can land AV and I/O such that multiple users can consume their games in the home simultaneously, whether in separate locations or when seated together in front of the same consumption device, e.g., a large television, where multiple games might be hosted simultaneously.

The systems described may use available telemetry to build a confidence-based knowledge graph of the user's gaming environment and position the user within that graph. A system with knowledge of many or all devices in a user's gaming environment would be able to build a knowledge graph by aggregating and comparing telemetry. For example, network telemetry may reveal that devices are positioned relatively near each other, a mobile device may reveal an absolute location based on GPS data, and an infrared presence sensor may reveal that the user is sitting in front a device. The system may assemble these individual pieces of telemetry into a broader knowledge graph based on the absolute and/or relative locations of the user's devices and the location of the user in relation. This knowledge graph would be repeatedly updated in real time as changes in device telemetry are detected, notifying subscribers of any changes.

Figure 15:
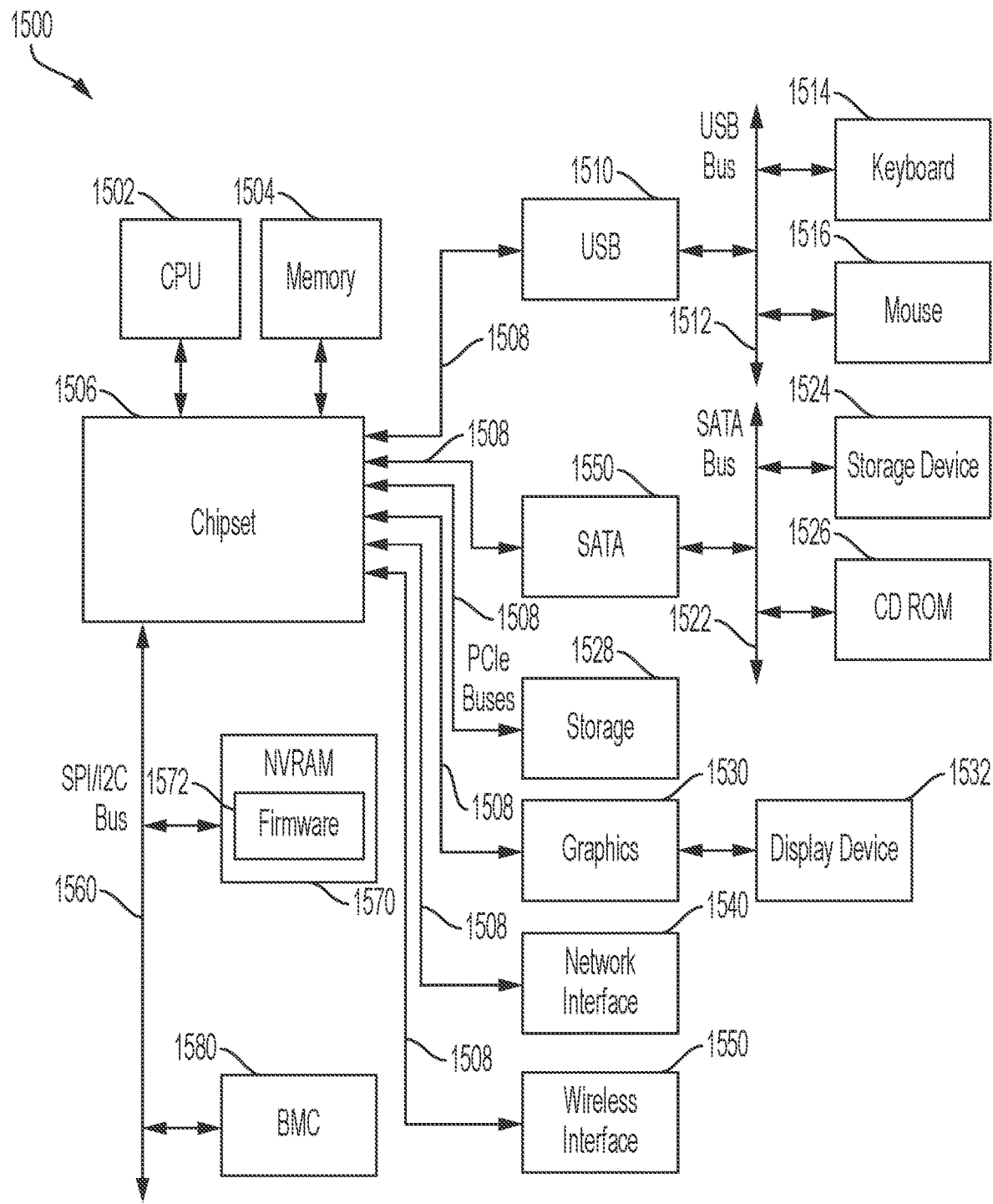
FIG. 15 is a schematic block diagram of an example information handling system according to some embodiments of the disclosure.

FIG. 15 illustrates an example information handling system 1500. Information handling system 1500 may include a processor 1502 (e.g., a central processing unit (CPU)), a memory (e.g., a dynamic random-access memory (DRAM)) 1504, and a chipset 1506. In some embodiments, one or more of the processor 1502, the memory 1504, and the chipset 1506 may be included on a motherboard (also referred to as a mainboard), which is a printed circuit board (PCB) with embedded conductors organized as transmission lines between the processor 1502, the memory 1504, the chipset 1506, and/or other components of the information handling system. The components may be coupled to the motherboard through packaging connections such as a pin grid array (PGA), ball grid array (BGA), land grid array (LGA), surface-mount technology, and/or through-hole technology. In some embodiments, one or more of the processor 1502, the memory 1504, the chipset 1506, and/or other components may be organized as a System on Chip (SoC).

The processor 1502 may execute program code by accessing instructions loaded into memory 1504 from a storage device, executing the instructions to operate on data also loaded into memory 1504 from a storage device, and generate output data that is stored back into memory 1504 or sent to another component. The processor 1502 may include processing cores capable of implementing any of a variety of instruction set architectures (ISAs), such as the x86, POWERPC®, ARM®, SPARC®, or MIPS® ISAs, or any other suitable ISA. In multi-processor systems, each of the processors 1502 may commonly, but not necessarily, implement the same ISA. In some embodiments, multiple processors may each have different configurations such as when multiple processors are present in a big-little hybrid configuration with some high-performance processing cores and some high-efficiency processing cores. The chipset 1506 may facilitate the transfer of data between the processor 1502, the memory 1504, and other components. In some embodiments, chipset 1506 may include two or more integrated circuits (ICs), such as a northbridge controller coupled to the processor 1502, the memory 1504, and a southbridge controller, with the southbridge controller coupled to the other components such as USB 1510, SATA 1520, and PCIe buses 1508. The chipset 1506 may couple to other components through one or more PCIe buses 1508.

Some components may be coupled to one bus line of the PCIe buses 1508, whereas some components may be coupled to more than one bus line of the PCIe buses 1508. One example component is a universal serial bus (USB) controller 1510, which interfaces the chipset 1506 to a USB bus 1512. A USB bus 1512 may couple input/output components such as a keyboard 1514 and a mouse 1516, but also other components such as USB flash drives, or another information handling system. Another example component is a SATA bus controller 1520, which couples the chipset 1506 to a SATA bus 1522. The SATA bus 1522 may facilitate efficient transfer of data between the chipset 1506 and components coupled to the chipset 1506 and a storage device 1524 (e.g., a hard disk drive (HDD) or solid-state disk drive (SDD)) and/or a compact disc read-only memory (CD-ROM) 1526. The PCIe bus 1508 may also couple the chipset 1506 directly to a storage device 1528 (e.g., a solid-state disk drive (SDD)). A further example of an example component is a graphics device 1530 (e.g., a graphics processing unit (GPU)) for generating output to a display device 1532, a network interface controller (NIC) 1540, and/or a wireless interface 1550 (e.g., a wireless local area network (WLAN) or wireless wide area network (WWAN) device) such as a Wi-Fi® network interface, a Bluetooth® network interface, a GSM® network interface, a 3G network interface, a 4G LTE® network interface, and/or a 5G NR network interface (including sub-6 GHz and/or mmWave interfaces). In one example embodiment, chipset 1506 may be directly connected to an individual end point via a PCIe root port within the chipset and a point-to-point topology as shown in FIG. 15.

The chipset 1506 may also be coupled to a serial peripheral interface (SPI) and/or Inter-Integrated Circuit (I2C) bus 1560, which couples the chipset 1506 to system management components. For example, a non-volatile random-access memory (NVRAM) 1570 for storing firmware 1572 may be coupled to the bus 1560. As another example, a controller, such as a baseboard management controller (BMC) 1580, may be coupled to the chipset 1506 through the bus 1560. BMC 1580 may be referred to as a service processor or embedded controller (EC). Capabilities and functions provided by BMC 1580 may vary considerably based on the type of information handling system. For example, the term baseboard management system may be used to describe an embedded processor included at a server, while an embedded controller may be found in a consumer-level device. As disclosed herein, BMC 1580 represents a processing device different from processor 1502, which provides various management functions for information handling system 1500. For example, an embedded controller may be responsible for power management, cooling management, and the like. An embedded controller included at a data storage system may be referred to as a storage enclosure processor or a chassis processor.

System 1500 may include additional processors that are configured to provide localized or specific control functions, such as a battery management controller. Bus 1560 can include one or more busses, including a Serial Peripheral Interface (SPI) bus, an Inter-Integrated Circuit (I2C) bus, a system management bus (SMBUS), a power management bus (PMBUS), or the like. BMC 1580 may be configured to provide out-of-band access to devices at information handling system 1500. Out-of-band access in the context of the bus 1560 may refer to operations performed prior to execution of firmware 1572 by processor 1502 to initialize operation of system 1500.

Firmware 1572 may include instructions executable by processor 1502 to initialize and test the hardware components of system 1500. For example, the instructions may cause the processor 1502 to execute a power-on self-test (POST). The instructions may further cause the processor 1502 to load a boot loader or an operating system (OS) from a mass storage device. Firmware 1572 additionally may provide an abstraction layer for the hardware, such as a consistent way for application programs and operating systems to interact with the keyboard, display, and other input/output devices. When power is first applied to information handling system 1500, the system may begin a sequence of initialization procedures, such as a boot procedure or a secure boot procedure. During the initialization sequence, also referred to as a boot sequence, components of system 1500 may be configured and enabled for operation and device drivers may be installed. Device drivers may provide an interface through which other components of the system 1500 can communicate with a corresponding device. The firmware 1572 may include a basic input-output system (BIOS) and/or include a unified extensible firmware interface (UEFI). Firmware 1572 may also include one or more firmware modules of the information handling system. Additionally, configuration settings for the firmware 1572 and firmware of the information handling system 1500 may be stored in the NVRAM 1570. NVRAM 1570 may, for example, be a non-volatile firmware memory of the information handling system 1500 and may store a firmware memory map namespace 1500 of the information handling system. NVRAM 1570 may further store one or more container-specific firmware memory map namespaces for one or more containers concurrently executed by the information handling system.

Information handling system 1500 may include additional components and additional busses, not shown for clarity. For example, system 1500 may include multiple processor cores (either within processor 1502 or separately coupled to the chipset 1506 or through the PCIe buses 1508), audio devices (such as may be coupled to the chipset 1506 through one of the PCIe busses 1508), or the like. While a particular arrangement of bus technologies and interconnections is illustrated for the purpose of example, one of skill will appreciate that the techniques disclosed herein are applicable to other system architectures. System 1500 may include multiple processors and/or redundant bus controllers. In some embodiments, one or more components may be integrated together in an integrated circuit (IC), which is circuitry built on a common substrate. For example, portions of chipset 1506 can be integrated within processor 1502. Additional components of information handling system 1500 may include one or more storage devices that may store machine-executable code, one or more communications ports for communicating with external devices, and various input and output (I/O) devices, such as a keyboard, a mouse, and a video display.

In some embodiments, processor 1502 may include multiple processors, such as multiple processing cores for parallel processing by the information handling system 1500. For example, the information handling system 1500 may include a server comprising multiple processors for parallel processing. In some embodiments, the information handling system 1500 may support virtual machine (VM) operation, with multiple virtualized instances of one or more operating systems executed in parallel by the information handling system 1500. For example, resources, such as processors or processing cores of the information handling system may be assigned to multiple containerized instances of one or more operating systems of the information handling system 1500 executed in parallel. A container may, for example, be a virtual machine executed by the information handling system 1500 for execution of an instance of an operating system by the information handling system 1500. Thus, for example, multiple users may remotely connect to the information handling system 1500, such as in a cloud computing configuration, to utilize resources of the information handling system 1500, such as memory, processors, and other hardware, firmware, and software capabilities of the information handling system 1500. Parallel execution of multiple containers by the information handling system 1500 may allow the information handling system 1500 to execute tasks for multiple users in parallel secure virtual environments. For example, parallel execution of services described herein may occur in parallel virtualized containers.

The schematic or flow chart diagrams of FIG. 4, FIG. 5, FIG. 10, FIG. 11, FIG. 12, FIG. 13, and FIG. 14 is generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Machine learning models, as described herein, may include logistic regression techniques, linear discriminant analysis, linear regression analysis, artificial neural networks, machine learning classifier algorithms, or classification/regression trees in some embodiments. In various other embodiments, machine learning systems may employ Naive Bayes predictive modeling analysis of several varieties, learning vector quantization artificial neural network algorithms, or implementation of boosting algorithms such as Adaboost or stochastic gradient boosting systems for iteratively updating weighting to train a machine learning classifier to determine a relationship between an influencing attribute, such as received device data, and a system, such as an environment or particular user, and/or a degree to which such an influencing attribute affects the outcome of such a system or determination of environment.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although processors are described throughout the detailed description, aspects of the invention may be applied to the design of or implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
  receiving, at a first hub device, a connection request from a first peripheral device for initiating an application session;
  determining, by the first hub device, first characteristics of the first peripheral device;
  determining, by the first hub device, a first service for execution by the first hub device and a first host device for the application session for the first peripheral device based on the first characteristics;
  initiating the application session for the first peripheral device with the first host device and the first service by
    establishing a first communication link between the first peripheral device and the first host device;
    establishing a streaming session between the first host device and the first service;
    determining, by the first hub, a second communication link between the first peripheral device and the first hub device has better characteristics than the first communication link between the first peripheral device and the first host device; and
    migrating, by the first hub, the first peripheral device to the second communication link while maintaining the streaming session between the first host device and the first service.

2. The method of claim 1, wherein determining a first service and a first host device for the application session comprises: determining a first location of the first peripheral device based on the first characteristics of the first peripheral device based on a knowledge graph; and determining a first environment corresponding to the first location, wherein the first host device is attached to the first environment.

3. The method of claim 2, wherein initiating the application session comprises:
  determining the first service is in a second environment different from the first environment;
  establishing a streaming session between the first host device and the first service.

4. The method of claim 2, further comprising:
  receiving, at the first hub device, a connection request from a second peripheral device;
  determining second characteristics of the second peripheral device;
  determining a second location of the second peripheral device based on characteristics of the second peripheral device based on the knowledge graph; and
  determining whether the second location corresponds to the first environment,
  wherein initiating the application session comprises initiating a shared application session with the first peripheral device and the second peripheral device when the first location and the second location both correspond to the first environment.

5. The method of claim 4, wherein determining first characteristics of the first peripheral device comprises determining a first wireless signature comprising one or more Wi-Fi access points, and wherein determining second characteristics of the second device comprises determining a second wireless signature comprising one or more Wi-Fi access points, wherein determining whether the second location corresponds to the first environment comprises determining whether the first wireless signature matches the second wireless signature.

6. The method of claim 4, further comprising:
  when the first location and the second location correspond to different environments:
    determining a second host device corresponding to the second environment based on the knowledge graph; and
    initiating a second application session for the second peripheral device by establishing a streaming session between the first service and the second host device.

7. The method of claim 1, further comprising:
  receiving a request for an application as part of the application session;
  determining a second service for executing the application based on llthell a knowledge graph; and
  migrating the first peripheral device from the first service to the second service.

8. The method of claim 2, further comprising determining the knowledge graph based on at least one of determining a direction between devices, determining a graph of device locations, determining proximity between devices, determining user locations from device locations, and determining device mobility.

9. The method of claim 2, wherein determining the migrating is further based on the knowledge graph.

10. An information handling system, comprising:
  a memory;
  a processor coupled to the memory, wherein the processor is configured to perform steps comprising:
    receiving, at a first hub device, a connection request from a first peripheral device for initiating an application session;
    determining first characteristics of the first peripheral device;
    determining a first service and a first host device for the application session for the first peripheral device based on a the first characteristics; and
    initiating the application session for the first peripheral device with the first host device and the first service by
      establishing a first communication link between the first peripheral device and the first host device;
      establishing a streaming session between the first host device and the first service;
      determining, by the first hub, a second communication link between the first peripheral device and the first hub device has better characteristics than the first communication link between the first peripheral device and the first host device; and migrating, by the first hub, the first peripheral device to the second communication link while maintaining the streaming session between the first host device and the first service.

11. The information handling system of claim 10, wherein determining a first service and a first host device for the application session comprises:

determining a first location of the first peripheral device based on the first characteristics of the first peripheral device based on knowledge graph; and determining a first environment corresponding to the first location, wherein the first host device is attached to the first environment.

12. The information handling system of claim 11, wherein initiating the application session comprises:

determining the first service is in a second environment different from the first environment;

establishing a streaming session between the first host device and the first service.

13. The information handling system of claim 11, wherein the processor is further configured to perform operations comprising:

receiving, at the first hub device, a connection request from a second peripheral device;

determining second characteristics of the second peripheral device;

determining a second location of the second peripheral device based on characteristics of the second peripheral device based on the knowledge graph; and determining whether the second location corresponds to the first environment, wherein initiating the application session comprises initiating a shared application session with the first peripheral device and the second peripheral device when the first location and the second location both correspond to the first environment.

14. The information handling system of claim 13, wherein determining first characteristics of the first peripheral device comprises determining a first wireless signature comprising one or more Wi-Fi access points, and wherein determining second characteristics of the second device comprises determining a second wireless signature comprising one or more Wi-Fi access points, wherein determining whether the second location corresponds to the first environment comprises determining whether the first wireless signature matches the second wireless signature.

15. The information handling system of claim 10, wherein the processor is further configured to perform operations comprising:

receiving a request for an application as part of the application session;

determining a second service for executing the application based on the knowledge graph; and migrating the first peripheral device from the first service to the second service.

16. A computer program product, comprising:

a non-transitory computer readable medium comprising code for performing steps comprising:

receiving, at a first hub device, a connection request from a first peripheral device for initiating an application session;

determining first characteristics of the first peripheral device;

determining a first service and a first host device for the application session for the first peripheral device based on a knowledge graph and the first characteristics; and initiating the application session for the first peripheral device with the first host device and the first service by establishing a first communication link between the first peripheral device and the first host device;

establishing a streaming session between the first host device and the first service;

determining, by the first hub, a second communication link between the first peripheral device and the first hub device has better characteristics than the first communication link between the first peripheral device and the first host device; and migrating, by the first hub, the first peripheral device to the second communication link while maintaining the streaming session between the first host device and the first service.

17. The computer program product of claim 16, wherein determining a first service and a first host device for the application session comprises:

determining a first location of the first peripheral device based on the first characteristics of the first peripheral device based on the knowledge graph; and determining a first environment corresponding to the first location, wherein the first host device is attached to the first environment.

18. The computer program product of claim 17, wherein initiating the application session comprises:

determining the first service is in a second environment different from the first environment;

establishing a streaming session between the first host device and the first service.

19. The computer program product of claim 17, wherein the processor ls further configured to perform operations comprising:

receiving, at the first hub device, a connection request from a second peripheral device;

determining second characteristics of the second peripheral device;

determining a second location of the second peripheral device based on characteristics of the second peripheral device based on the knowledge graph; and determining whether the second location corresponds to the first environment, wherein initiating the application session comprises initiating a shared application session with the first peripheral device and the second peripheral device when the first location and the second location both correspond to the first environment.

20. The computer program product of claim 19, wherein determining first characteristics of the first peripheral device comprises determining a first wireless signature comprising one or more Wi-Fi access points, and wherein determining second characteristics of the second device comprises determining a second wireless signature comprising one or more Wi-Fi access points, wherein determining whether the second location corresponds to the first environment comprises determining whether the first wireless signature matches the second wireless signature.

* * * * *